Jan. 5, 1960 T. E. KAPSCH 2,919,755
FLEXIBLE HARROW AND CONVERTER MEANS THEREFOR
Filed Sept. 3, 1957

Tobie E. Kapsch
INVENTOR.

BY *Clarence A. O'Brien*
*and Harvey B. Jacobson*
Attorneys

United States Patent Office 2,919,755
Patented Jan. 5, 1960

2,919,755
FLEXIBLE HARROW AND CONVERTER MEANS THEREFOR

Tobie E. Kapsch, Freeman, S. Dak.

Application September 3, 1957, Serial No. 681,834

3 Claims. (Cl. 172—245)

The present invention relates to certain new and useful improvements in harrows, for example, flexible peg-tooth harrows and has reference, more in particular, to readily applicable and removable converter attachments making it possible to use the harrow as a flexible construction on the one hand or, wherever necessary or desired, as a rigid harrow.

Revealed somewhat more explicitly a typical harrow under consideration is the John Deere pipe-bar harrow which is currently being used because of its suitability to stubble land in the Northwest and to stony grounds. As a glance at the drawing will show, the flexible harrow is characterized by heavy round pipe-bars which are flexibly linked together. The connecting links serve to prevent the bars from moving from side to side and cause the teeth to trail each other. At the same time the link construction provides the necessary flexibility of an up-and-down nature to permit the peg-type teeth to conform to the contour or surface of rough ground. Harrows of this type are also used because they can actually be rolled in carpet-like fashion and carried in a wagon. In any event, the purpose of the attachment herein under advisement is to convert the stated flexible harrow into a rigid harrow by merely applying the necessary rigidifying members. Hence with a flexible harrow on hand and also the attachments which are herein offered as novel improvements the owner may have a harrow which can serve both flexible and rigid harrowing requirements. At times due to soil, climate and whether the ground has been plowed, it becomes advantageous to use a rigid harrow. This particularly so since it does not have a tendency to ride over the top of clods or equivalent irregular obstacles and surfaces.

In carrying out a preferred embodiment of the invention the rigidifying means takes the form of a simple elongated angle iron. This provided at longitudinally spaced points with inverted U-shaped adapters. The adapters are held in place by an insertable and removable assembling and retaining rod.

Other objects, features and advantages will become more readily apparent from the following description and the accompanying drawing.

In the drawing wherein like numerals are employed to designate like parts throughout the views.

Figure 3:
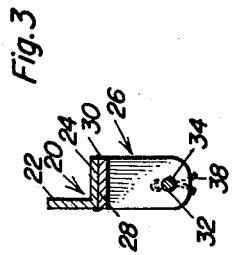
Fig. 3 is a section on the vertical line 3—3 of Fig. 2 looking in the direction of the arrows.
Figure 1:
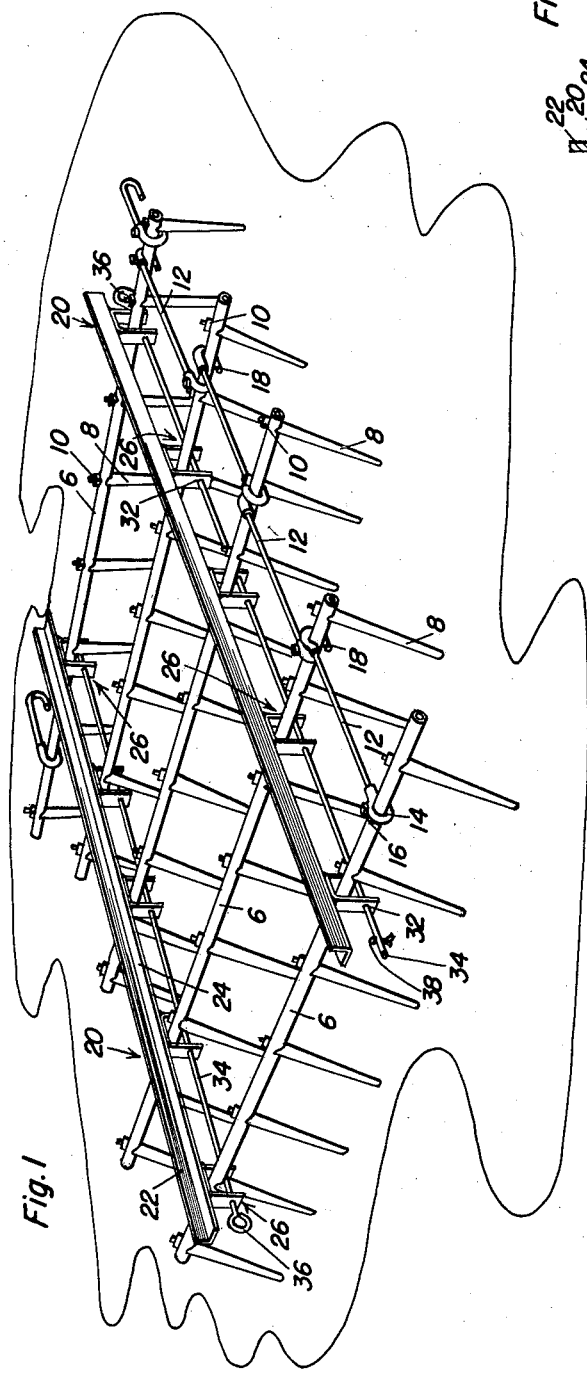
Fig. 1 is a perspective view of a conventional John Deere flexible pipe-bar harrow with the improved converter attachments applied.
Figure 2:
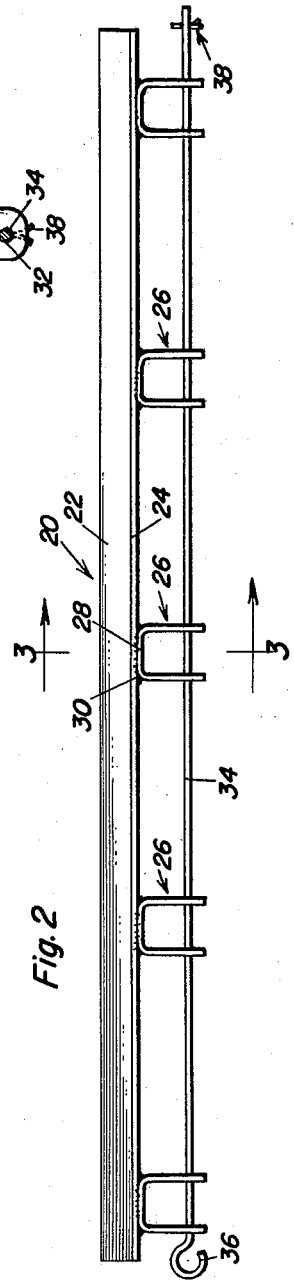
Fig. 2 is a view on a larger scale of the converter attachment by itself.

As is evident from Fig. 1, the harrow, as such, is a conventional John Deere flexible pipe-bar harrow. The pipes or bars are denoted in each component by the numeral 6. The peg-type teeth 8 are at right angles thereto and are separably bolted in place at 10.

These toothed pipe-bars are separable, operably and flexibly connected together by links 12 with one link having an eye 14 with a setscrew 16. A hook connector 18 on the other end of the link serves to provide the desired assembling and connection of the parts.

As a general rule two units or attachments for each harrow section will be necessary. However, each attachment is the same in construction and the description of one will suffice for both. This attachment may and can also be made to fit different makes of flexible harrows in which a similar structural arrangement of components is employed in the harrow construction.

The rigidifying means of the attachment is denoted generally by the numeral 20. More specifically, this means comprises an elongated angle iron, vertical flange 22 being disposed upwardly in a plane above the pipe-bars 6. The horizontal flange 24 is provided at longitudinally spaced points with depending inverted U-shaped adapters or clevises 26. The bight portion 28 is superimposed against the bottom of the flange and welded thereto at 30. The depending arms are provided with rod openings 32 which are properly alined up to accommodate the insertable and removable attaching and retaining rod 34. This extends beneath the parallel pipe-bars and consequently the pipe-bars are saddled within the limbs of the U-shaped adapters and the conversion from flexible to rigid harrow is attained. At one end the rod is provided with a finger-grip 36 and at the other end it is constructed with a hole to accommodate an insertable and removable cotter-key 38.

With the construction shown, and as already pointed out, it is possible for the owner to have at his disposal either a flexible peg-tooth harrow or a rigid harrow whichever, at the time, is desired or required.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a flexible peg-tooth harrow comprising a plurality of spaced parallel complemental toothed units, each comprising an elongated header pipe rigid and provided with a plurality of longitudinally spaced depending harrow teeth, means flexibly linking said components together in harrow-forming relationship, said means embodying links joining the header pipes of said components so that they may have independent harrow-forming relationship, at least one rigidifying member disposed above the components, and means detachably connecting said member atop said components so that they will remain substantially in relatively rigid coplanar relationship, said means comprising a longitudinally elongated rigid bar provided with depending U-shaped adapters, and means carried by and detachably joining the adapters to the header pipes of the stated components.

2. In combination, a flexible pipe-bar peg-tooth harrow embodying a plurality of peg-tooth units each having a header pipe provided with a plurality of longitudinally spaced harrow teeth depending therefrom, flexible linking means assembling and connecting the respective outer end portions of the header pipes together in a manner providing a flexible-type harrow, at least one elongated rigidifying angle iron having vertical and horizontal flanges, a plurality of inverted U-shaped adapters having bight portions fixed to the underneath side of said horizontal flange at longitudinally spaced points and depending arms straddling adjacent cooperating header pipes, the lower ends of said arms being provided with rod openings, and a rod passing removably through the openings provided therefor and extending beneath the header pipes, whereby the angle iron is above and the rod is below said header pipes.

3. For use in converting a flexible pipe-bar peg-tooth harrow which is made up of toothed link-connected units from flexible to rigid form, a converter attachment comprising an elongated angle iron having vertical and horizontal flanges, a plurality of inverted U-shaped adapters having bight portions fixed to an underneath side of the horizontal flange at longitudinally spaced points, each adapter having depending arms spaced apart to allow the arms to straddle and depend below adjacent cooperating header pipes such as are embodied in said units, the lower end portions of the respective arms being provided with aligned rod openings which will reside in a plane below the header pipes, and a readily insertable and removable rod passing through the openings provided therefor whereby to permit the angle iron to be disposed above the header pipes and the rod in a plane below the plane of the header pipes.

References Cited in the file of this patent

UNITED STATES PATENTS

| | | |
|---|---|---|
| 198,716 | Wertman | Dec. 25, 1877 |
| 325,541 | Hirshheimer | Sept. 1, 1885 |
| 1,067,506 | Cameron et al. | July 15, 1913 |
| 2,307,930 | Kucera | Jan. 12, 1943 |